(12) United States Patent
Nagata

(10) Patent No.: US 12,725,889 B2
(45) Date of Patent: Sep. 1, 2026

(54) BATTERY

(71) Applicant: TOYOTA JIDOSHA KABUSHIKI KAISHA, Toyota (JP)

(72) Inventor: Yuka Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 613 days.

(21) Appl. No.: 18/206,672

(22) Filed: Jun. 7, 2023

(65) Prior Publication Data

US 2024/0055737 A1 Feb. 15, 2024

(30) Foreign Application Priority Data

Aug. 15, 2022 (JP) ................................ 2022-129241

(51) Int. Cl.
*H01M 50/547* (2021.01)
*H01M 50/566* (2021.01)

(52) U.S. Cl.
CPC ....... *H01M 50/547* (2021.01); *H01M 50/566* (2021.01)

(58) Field of Classification Search
CPC .......................... H01M 50/547; H01M 50/566
See application file for complete search history.

(56) References Cited

U.S. PATENT DOCUMENTS 7,326,492 B2 * 2/2008 Abe .................... H01M 50/562 429/162
2002/0146621 A1 * 10/2002 Yageta ............... H01R 13/5216 429/185

(Continued)

FOREIGN PATENT DOCUMENTS

JP 2004111303 A * 4/2004
JP 2007157615 A * 6/2007

(Continued)

OTHER PUBLICATIONS

Machine Translation of JP-2004111303-A (Jan. 13, 2026) (Year: 2026).*

(Continued)

*Primary Examiner* — Matthew J Merkling
(74) *Attorney, Agent, or Firm* — Dinsmore & Shohl LLP

(57) ABSTRACT

A battery includes: an electrode body; a current collector terminal; and a laminate film. An outer edge of the current collector terminal is located on an inner side of an outer edge of the electrode body. The laminate film is disposed so as to cover surfaces constituting the outer edges of the current collector terminal and the electrode body. A welded portion in which inner surfaces of the laminate film are welded to each other is disposed at a corner portion of the current collector terminal. The laminate film includes at least a metal layer. In the welded portion, a first resin layer is disposed between the metal layers facing each other. A second resin layer is disposed between the metal layer and the current collector terminal. A thickness of the first resin layer $T_a$ and a thickness of the second resin layer $T_b$ satisfy $0.25 \leq T_a/T_b$.

4 Claims, 6 Drawing Sheets

(56) References Cited

U.S. PATENT DOCUMENTS

| | | | | |
|---|---|---|---|---|
| 2004/0197646 | A1* | 10/2004 | Hatta | H01M 50/562 429/231.95 |
| 2007/0292753 | A1* | 12/2007 | Zama | H01M 50/548 429/185 |
| 2010/0216016 | A1* | 8/2010 | Seino | H01M 50/55 429/185 |
| 2011/0117404 | A1 | 5/2011 | Ahn et al. | |
| 2022/0013306 | A1 | 1/2022 | Yasuda et al. | |
| 2023/0116359 | A1* | 4/2023 | Kato | H01M 50/178 429/179 |
| 2023/0155260 | A1* | 5/2023 | Sasaki | H01G 11/10 429/179 |
| 2024/0039094 | A1* | 2/2024 | Maeda | H01M 50/162 |

FOREIGN PATENT DOCUMENTS

| | | | | | |
|---|---|---|---|---|---|
| JP | 4154633 | B2 | * | 9/2008 | H01M 50/562 |
| JP | 2010219024 | A | * | 9/2010 | H01M 50/557 |
| JP | 2011-108623 | A | | 6/2011 | |
| JP | 2011249343 | A | * | 12/2011 | |
| JP | 2018-142483 | A | † | 9/2018 | |
| JP | 2021-150231 | A | † | 9/2021 | |
| JP | 2021-190281 | A | | 12/2021 | |
| WO | WO-2014178238 | A1 | * | 11/2014 | H01M 50/178 |
| WO | 2019/142702 | A1 | | 7/2019 | |
| WO | 2020/085462 | A1 | | 4/2020 | |
| WO | 2021/049572 | A1 | | 3/2021 | |

OTHER PUBLICATIONS

Machine Translation of JP-2011249343-A (Jan. 13, 2026) (Year: 2026).*

Machine Translation of WO-2014178238-A1 (Jan. 13, 2026) (Year: 2026).*

Machine Translation of JP-2007157615-A (Apr. 14, 2026) (Year: 2026).*

Machine Translation of JP-2010219024-A (Apr. 14, 2026) (Year: 2026).*

Machine Translation of JP-4154633-B2 (Apr. 14, 2026) (Year: 2026).*

U.S. Appl. No. 18/303,626, filed Apr. 20, 2023.

* cited by examiner
† cited by third party

BATTERY

CROSS-REFERENCE TO RELATED APPLICATION

This application claims priority to Japanese Patent Application No. 2022-129241 filed on Aug. 15, 2022, incorporated herein by reference in its entirety.

BACKGROUND

1. Technical Field

The present disclosure relates to a battery.

2. Description of Related Art

A battery such as a lithium ion secondary battery generally includes an electrode body having a positive electrode current collector, a positive electrode active material layer, an electrolyte layer, a negative electrode active material layer, and a negative electrode current collector. The electrode body is, for example, sealed in an internal space surrounded by an exterior material. Japanese Unexamined Patent Application Publication No. 2011-108623 (JP 2011-108623 A) discloses a lithium polymer secondary battery that includes an electrode assembly, an exterior material surrounding the exterior of the electrode assembly, and a first cover and a second cover that seal the exterior material, in which a first electrode terminal and a second electrode terminal are pulled out through the first cover and the second cover, respectively. Further, in JP 2011-108623 A, a laminate film is described as the exterior material. Japanese Unexamined Patent Application Publication No. 2021-190281 (JP 2021-190281 A) discloses a battery using an exterior body made of one sheet of film, in which a rib structure is provided at a corner portion of the side orthogonal to an end surface where a current collector tab lead is extended and provided, the rib structure being provided by multiple films being laminated.

SUMMARY

As shown in FIGS. 3A, 3B, 3C, and 3D described below, the dimensions of the current collector terminal may be smaller than the dimensions of the electrode body. When the current collector terminal having such a dimensional relationship is sealed with a laminate film, wrinkles may occur in the laminate film, for example, and sealing performance of the battery may be deteriorated. In order to solve such an issue, the inventors have conceived of providing a welded portion in which the inner surfaces of the laminate film are welded to each other, on the current collector terminal. By providing the welded portion, deterioration in sealing performance can be suppressed. The welded portion is often provided at the corner portion of the current collector terminal due to the manufacturing process. From the viewpoint of suppressing deterioration in sealing performance, it is desirable that the occurrence of poor welding at the welded portion is suppressed.

The present disclosure has been made in view of the above circumstances, and a main object of the present disclosure is to provide a battery in which the occurrence of poor welding at the welded portion is suppressed.

(1)

A battery includes: an electrode body; a current collector terminal disposed on a side surface portion of the electrode body; and a laminate film covering the electrode body. When the battery is viewed from the current collector terminal side in side view, an outer edge of the current collector terminal is located on an inner side of an outer edge of the electrode body. The laminate film is disposed so as to cover a surface constituting the outer edge of the current collector terminal and a surface constituting the outer edge of the electrode body. A welded portion in which inner surfaces of the laminate film are welded to each other is disposed at a corner portion of the current collector terminal. The laminate film includes at least a metal layer. In the welded portion, a first resin layer is disposed between the metal layers facing each other. A second resin layer is disposed between the metal layer and the current collector terminal. When a thickness of the first resin layer is $T_a$ and a thickness of the second resin layer is $T_b$, the $T_a$ and the $T_b$ satisfy $0.25 \leq T_a/T_b$.

(2)

In the battery according to (1), when a thickness of the metal layer in the welded portion is $T_c$, the $T_a$ and the $T_c$ satisfy $0.5 \leq T_a/T_c \leq 4$.

(3)

In the battery according to (1) or (2), the laminate film includes an inner resin layer on a surface of the metal layer on the current collector terminal side, and the first resin layer and the second resin layer each include the inner resin layer.

(4)

In the battery according to (3), a resin film is disposed between the inner resin layer and the current collector terminal, and the first resin layer includes the resin film.

The battery according to the present disclosure has the effect of being able to suppress the occurrence of poor welding at the welded portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 12A is a schematic side view illustrating a second covering step in the present disclosure;

FIG. 12B is a schematic side view illustrating the second covering step in the present disclosure;

FIG. 12C is a schematic side view illustrating the second covering step in the present disclosure; and FIG. 13 shows results of a thermal shock test on batteries obtained in examples.

DETAILED DESCRIPTION OF EMBODIMENTS

Hereinafter, embodiments in the present disclosure will be described in detail with reference to the drawings. Each drawing shown below is schematically shown, and the size and shape of each part are appropriately exaggerated for easy understanding. In the present specification, when the term “above” or “below” is used to describe how one member is disposed with respect to another member, it includes a case where the one member is disposed directly above or directly below the other member in such a manner that the one member is in contact with the other member and a case where the one member is disposed above or below the other member with still another member interposed therebetween, unless otherwise specified.

A. Battery

Figure 1A:
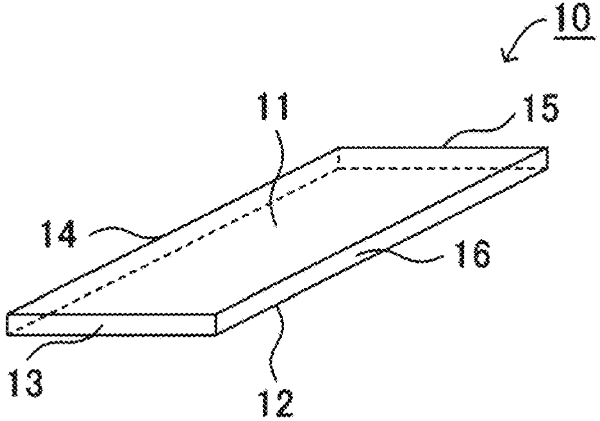
FIG. 1A is a schematic perspective view illustrating an electrode body in the present disclosure.
Figure 1B:
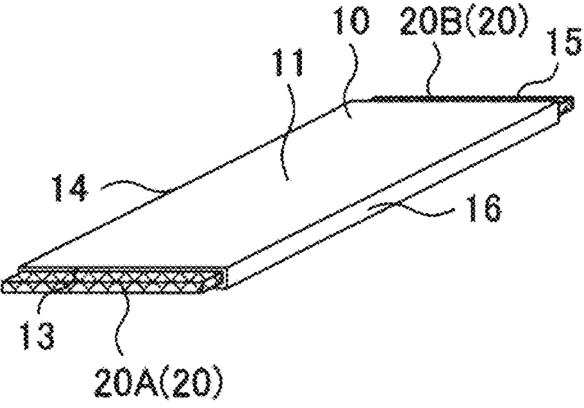
FIG. 1B is a schematic perspective view illustrating the electrode body and a current collector terminal in the present disclosure.

FIG. 1A is a schematic perspective view illustrating an electrode body in the present disclosure, and FIG. 1B is a schematic perspective view illustrating the electrode body and a current collector terminal in the present disclosure. The electrode body 10 shown in FIG. 1A includes a top surface portion 11, a bottom surface portion 12 opposite to the top surface portion 11, and four side surface portions (a first side surface portion 13, a second side surface portion 14, a third side surface portion 15, and a fourth side surface portion 16) that connect the top surface portion 11 and the bottom surface portion 12. In FIG. 1B, a first current collector terminal 20A is disposed on the first side surface portion 13 of the electrode body 10, and a second current collector terminal 20B is disposed on the third side surface portion 15 of the electrode body 10. For example, the first current collector terminal 20A is a positive electrode current collector terminal, and the second current collector terminal 20B is a negative electrode current collector terminal.

Figure 2A:
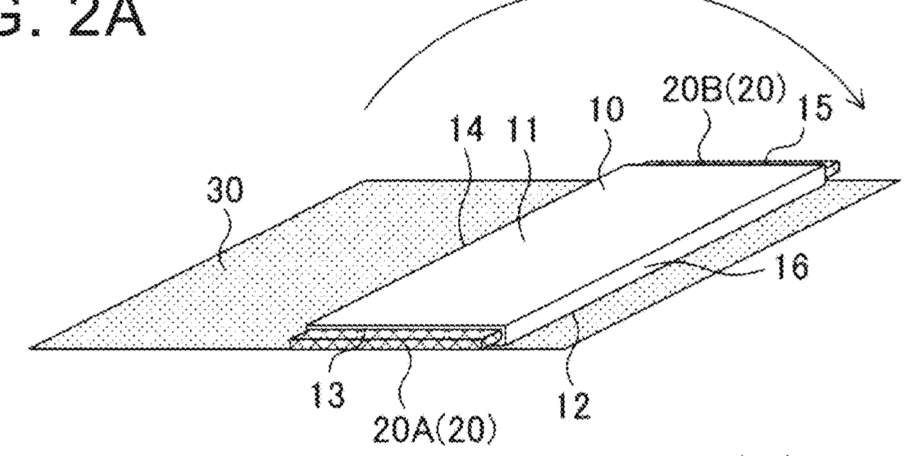
FIG. 2A is a schematic perspective view illustrating the electrode body, the current collector terminal, and a laminate film in the present disclosure.
Figure 2B:
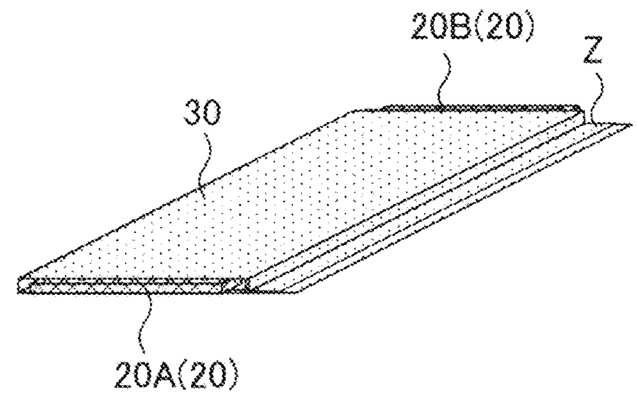
FIG. 2B is a schematic perspective view illustrating the electrode body, the current collector terminal, and the laminate film in the present disclosure.

FIGS. 2A and 2B are each a schematic perspective view illustrating the electrode body, the current collector terminal, and a laminate film in the present disclosure. As shown in FIG. 2A, a laminate film 30 is, for example, one sheet of film. As shown in FIGS. 2A and 2B, the laminate film 30 is folded so as to entirely cover the bottom surface portion 12, the second side surface portion 14, the top surface portion 11, and the fourth side surface portion 16 of the electrode body 10. On the other hand, in FIG. 2B, at least a part of the first current collector terminal 20A and at least a part of the second current collector terminal 20B are located inside the folded laminate film 30.

Figure 3A:
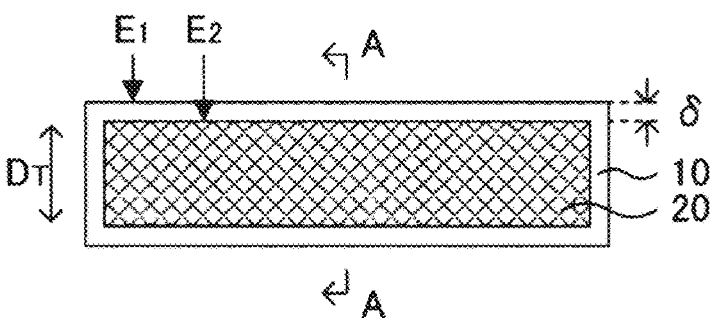
FIG. 3A is a schematic side view illustrating the electrode body, the current collector terminal, and the laminate film in the present disclosure.
Figure 3B:
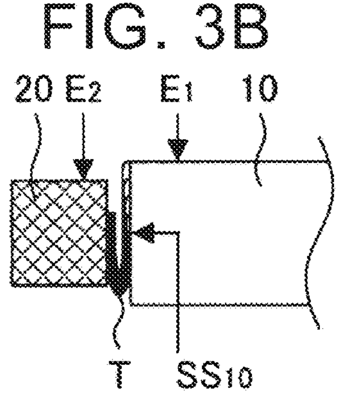
FIG. 3B is a schematic sectional view illustrating the electrode body, the current collector terminal, and the laminate film in the present disclosure.

FIG. 3A is a schematic side view illustrating the electrode body and the current collector terminal in the present disclosure, and FIG. 3B is a sectional view taken along line A-A in FIG. 3A. As shown in FIGS. 3A and 3B, when the electrode body 10 and the current collector terminal 20 are viewed from the current collector terminal 20 side, an outer edge $E_2$ of the current collector terminal 20 is located on an inner side of an outer edge $E_1$ of the electrode body 10. That is, the dimensions of the current collector terminal 20 are smaller than the dimensions of the electrode body 10. In addition, as shown in FIG. 3B, the electrode body 10 has a current collector tab T on the side surface portion $SS_{10}$ The current collector tab T is joined on a surface (surface facing the side surface portion $SS_{10}$ of the electrode body 10) of the current collector terminal 20.

Figure 3C:
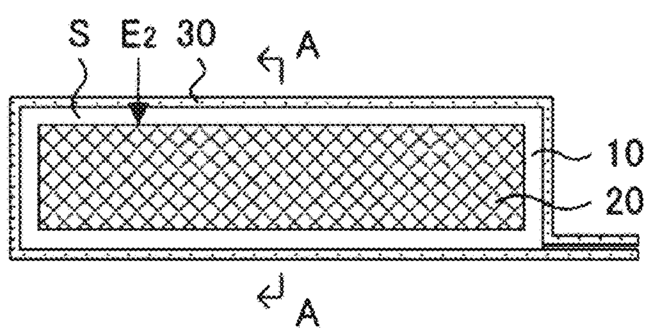
FIG. 3C is a schematic side view illustrating the electrode body, the current collector terminal, and the laminate film in the present disclosure.
Figure 3D:
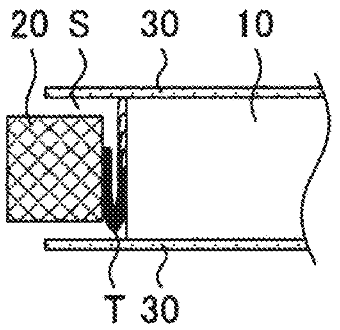
FIG. 3D is a schematic sectional view illustrating the electrode body, the current collector terminal, and the laminate film in the present disclosure.
Figure 4A:
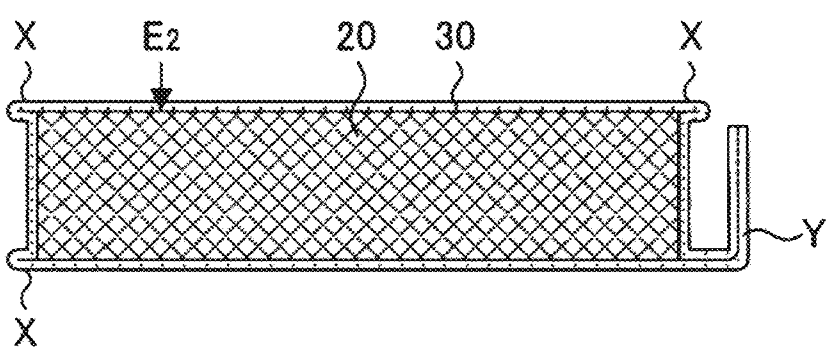
FIG. 4A is a schematic side view illustrating part of a battery in the present disclosure.
Figure 4B:
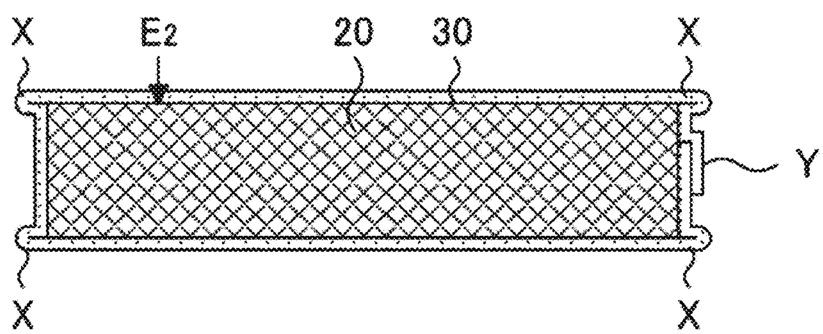
FIG. 4B is a schematic side view illustrating part of the battery in the present disclosure.

FIG. 3C is a schematic side view illustrating the electrode body, the current collector terminal, and the laminate film in the present disclosure, and FIG. 3D is a sectional view taken along line A-A in FIG. 3C. As shown in FIGS. 3C and 3D, when the electrode body 10, the current collector terminal 20, and the laminate film 30 are viewed from the current collector terminal 20 side, there is a space S between the laminate film 30 and the current collector terminal 20. Therefore, when the current collector terminal 20 is sealed with the laminate film 30, wrinkles may occur in the laminate film 30 due to the surplus portion of the laminate film 30, and sealing performance of the battery may be deteriorated. On the other hand, in the battery according to the present disclosure, as shown in FIGS. 4A and 4B, a welded portion X in which the inner surfaces (the surfaces on the current collector terminal 20 side) of the laminate film 30 are welded to each other is disposed at a corner portion of the current collector terminal 20. By providing the welded portion X, it is possible to suppress deterioration in sealing performance due to wrinkles in the laminate film.

Figure 5:
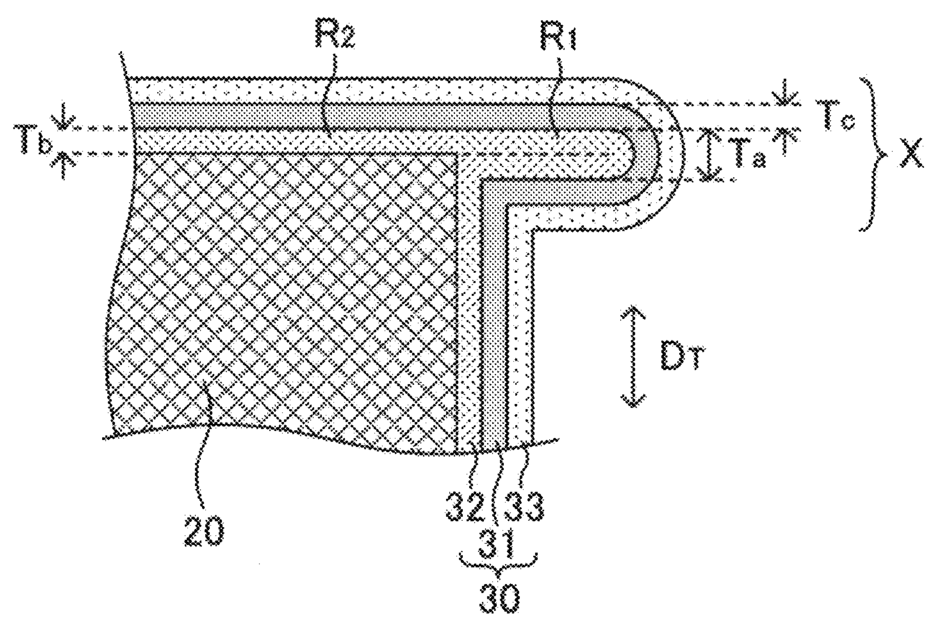
FIG. 5 is a schematic side view illustrating part of the battery in the present disclosure.

The laminate film 30 shown in FIG. 5 includes a metal layer 31, an inner resin layer 32 disposed on a surface of the metal layer 31 on the current collector terminal 20 side, and an outer resin layer 33 disposed on a surface of the metal layer 31 on the opposite side of the metal layer 31 from the current collector terminal 20. Also, in the welded portion X, a first resin layer $R_1$ is disposed between the metal layers 31 facing each other. A second resin layer $R_2$ is disposed between the metal layer 31 and the current collector terminal 20. In FIG. 5, the first resin layer $R_1$ and the second resin layer $R_2$ are each the inner resin layer 32 of the laminate film 30. Also, the first resin layer $R_1$ and the second resin layer $R_2$ are arranged continuously. As shown in FIG. 5, when the thickness of the first resin layer $R_1$ is $T_a$ and the thickness of the second resin layer $R_2$ is $T_b$, $T_a$ and $T_b$ satisfy $0.25 \leq T_a/T_b$.

According to the present disclosure, since the welded portion is disposed on the current collector terminal, a battery in which deterioration in sealing performance is suppressed is provided. As shown in FIGS. 3A, 3B, 3C, and 3D described above, the dimensions of the current collector terminal may be smaller than the dimensions of the electrode body. By adopting such a dimensional relationship, it is possible to suppress contact between the adjacent current collector terminals when, for example, multiple batteries are stacked together. By suppressing contact between the adjacent current collector terminals, the battery is less likely to be damaged. In addition, when the current collector terminal having such a dimensional relationship is sealed with a laminate film, wrinkles may occur in the laminate film, for example, and the sealing performance of the battery may be deteriorated. In the present disclosure, by disposing the welded portion X in which the inner surfaces of the laminate film are welded to each other, on the current collector terminal, even when the dimensions of the current collector terminal are smaller than the dimensions of the electrode body, a battery in which deterioration in sealing performance is suppressed is provided. On the other hand, as described above, the welded portion is often provided at the corner portion of the current collector terminal due to the manufacturing process. From the viewpoint of suppressing deterioration in sealing performance, it is desirable that the occurrence of poor welding at the welded portion is suppressed. In view of this, according to the present disclosure, by setting $T_a$ larger than $T_b$, the adhesion at the welded portion can be improved, and the occurrence of poor welding at the welded portion can be suppressed.

1. Battery Configuration

The battery in the present disclosure includes at least the electrode body, the current collector terminal, and the laminate film.

(1) Electrode Body

The electrode body in the present disclosure functions as a power generation element of the battery. Although the shape of the electrode body is not particularly limited, the electrode body includes, for example, as shown in FIG. 1A, a top surface portion 11, a bottom surface portion 12 opposite to the top surface portion 11, and four side surface portions (a first side surface portion 13, a second side surface portion 14, a third side surface portion 15, and a fourth side surface portion 16) that connect the top surface portion 11 and the bottom surface portion 12. Both the top surface portion 11 and the bottom surface portion 12 correspond to the main surface of the electrode body, and the normal direction of the main surface can be defined as the thickness direction. Also, the first side surface portion 13 and the third side surface portion 15 are arranged so as to be located on the opposite sides of the electrode body. Also, the second side surface portion 14 and the fourth side surface portion 16 are arranged so as to be located on the opposite sides of the electrode body.

The shape of the top surface portion is not particularly limited. However, examples thereof include quadrilaterals such as a square, a rectangle, a rhombus, a trapezoid, and a parallelogram. The shape of the top surface portion 11 in FIG. 1A is rectangular. The shape of the top surface portion may be a polygonal shape other than a quadrilateral, or may be a shape having a curve such as a circular shape. Also, the shape of the bottom surface portion is the same as the shape of the top surface portion. The shape of the side surface portion is not particularly limited. However, examples thereof include quadrilaterals such as a square, a rectangle, a rhombus, a trapezoid, and a parallelogram.

(2) Current Collector Terminal

The current collector terminal in the present disclosure is disposed on the side surface portion of the electrode body. The battery in the present disclosure desirably has two current collector terminals for one electrode body. For example, as shown in FIG. 1B, a pair of current collector terminals 20 (a first current collector terminal 20A and a second current collector terminal 20B) may be disposed in such a manner that the first current collector terminal 20A is on the opposite side of the electrode body 10 from the second current collector terminal 20B. Also, in FIG. 1B, the current collector terminals 20 are disposed so as to be on the opposite sides of the electrode body 10 in the longitudinal direction of the electrode body 10.

When the battery is viewed from the current collector terminal side in side view, the shape of the current collector terminal is not particularly limited. However, examples thereof include quadrilaterals such as a square, a rectangle, a rhombus, a trapezoid, and a parallelogram. The shape of the current collector terminal 20 in FIG. 3A is rectangular. In this rectangle, the short sides extend along a direction parallel to the thickness direction $D_T$, and the long sides extend along a direction perpendicular to the thickness direction $D_T$.

When the battery is viewed from the current collector terminal side in side view, an outer edge of the current collector terminal is located on an inner side of the outer edge of the electrode body. For example, as shown in FIG. 3A, the outer edge $E_2$ of the current collector terminal 20 is located on an inner side of the outer edge $E_1$ of the electrode body 10. In other words, the outer edge $E_2$ of the current collector terminal 20 is included in the outer edge $E_1$ of the electrode body 10 over the entire circumference.

For example, in FIG. 3A, the length (perimeter length) of the outer edge $E_1$ of the electrode body 10 is $L_1$, and the length (perimeter length) of the outer edge $E_2$ of the current collector terminal 20 is $L_2$. The ratio of $L_2$ to $L_1$ ($L_2/L_1$) is, for example, 0.7 or more and less than one, and may be 0.8 or more and 0.95 or less. For example, in FIG. 3A, the length of the outer edge $E_1$ in the thickness direction $D_T$ is $L_a$, and the length of the outer edge $E_2$ in the thickness direction $D_T$ is $L_b$. The ratio of $L_b$ to $L_a$ ($L_b/L_a$) is, for example, 0.5 or more and less than one, and may be 0.8 or more and 0.95 or less. For example, in FIG. 3A, the length of the outer edge $E_1$ in the direction orthogonal to the thickness direction $D_T$ is $L_c$, and the length of the outer edge $E_2$ in the direction orthogonal to the thickness direction $D_T$ is $L_d$. The ratio of $L_d$ to $L_c$ ($L_d/L_c$) is, for example, 0.5 or more and less than one, and may be 0.8 or more and 0.95 or less. For example, in FIG. 3A, the length of the gap between the outer edge $E_1$ and the outer edge $E_2$ is $\delta$. The length $\delta$ is greater than 0 mm, and may be 0.3 mm or more, or may be 0.5 mm or more. On the other hand, the length $\delta$ is, for example, 1.5 mm or less.

(3) Laminate Film

The laminate film in the present disclosure covers the electrode body and seals the electrode body together with the current collector terminal. As shown in FIGS. 2A and 2B, when the electrode body 10 and the current collector terminal 20 are viewed from the current collector terminal 20 side, the laminate film 30 is disposed so as to cover a surface forming the outer edge of the current collector terminal 20 and a surface forming the outer edge of the electrode body 10. Further, as shown in FIG. 4A, a welded portion X in which the inner surfaces of the laminate film 30 are welded to each other is disposed at the corner portion of the current collector terminal 20. It is desirable that a welding surface of the welded portion X does not have a gap. The laminate film may have one welded portion X, or may have two or more welded portions. Also, the welded portions X may be disposed at two corner portions of the current collector terminal, respectively, the corner portions being on opposite sides of the current collector terminal in the thickness direction. Further, in FIG. 4A, an end portions-adhesion portion Y in which the end portions of the laminate film 30 are welded to each other is disposed. The end portions-adhesion portion Y may be subjected to a bending process in accordance with the shape of the current collector terminal. This is because redundant space can be reduced. Moreover, as shown in FIG. 4B, the shape of the current collector terminal 20 may be quadrilateral, and the welded portions X may be disposed at all the corner portions thereof. In FIG. 4B, the end portions-adhesion portion Y is disposed on a side connecting two corner portions.

Figure 6:
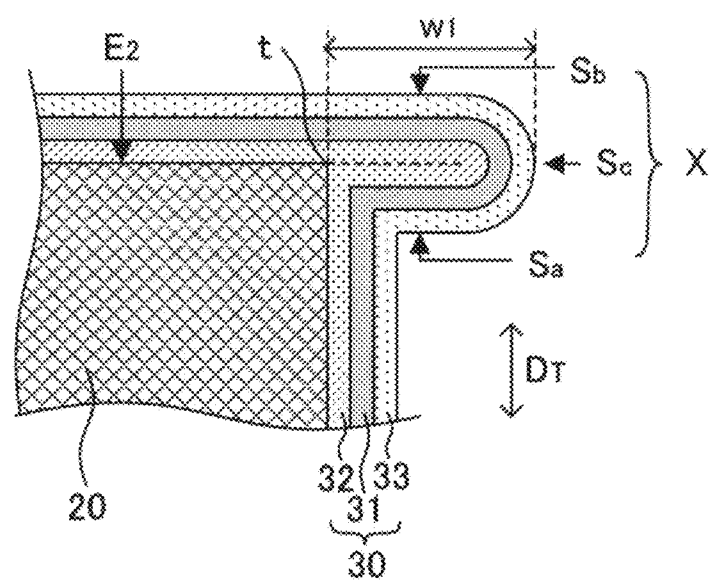
FIG. 6 is a schematic side view illustrating part of the battery in the present disclosure.

As shown in FIG. 6, the welded portion X may include a first surface $S_a$, a second surface $S_b$, and a curved surface $S_c$ connecting the first surface $S_a$ and the second surface $S_b$. The second surface $S_b$ is on the opposite side of the inner resin layer 32 from the first surface $S_a$ and is located on an outer side of the first surface $S_a$ in the thickness direction $D_T$ of the battery. Moreover, the normal direction of the first surface $S_a$ and the normal direction of the second surface $S_b$ are desirably parallel to the thickness direction $D_T$ of the battery. "Parallel" means that the angle formed by the two directions is 20° or less.

In FIG. 6, when the battery is viewed from the current collector terminal 20 side, the welded portion X is disposed at a corner portion t forming the outer edge $E_2$ of the current collector terminal 20. Also, as shown in FIG. 6, the width of the welded portion X is $w_1$. The width $w_1$ is, for example, 0.1 mm or more, and may be 0.3 mm or more, or may be 0.6 mm or more. On the other hand, the width $w_1$ is, for example, 2 mm or less, and may be 1.5 mm or less.

Figure 7:
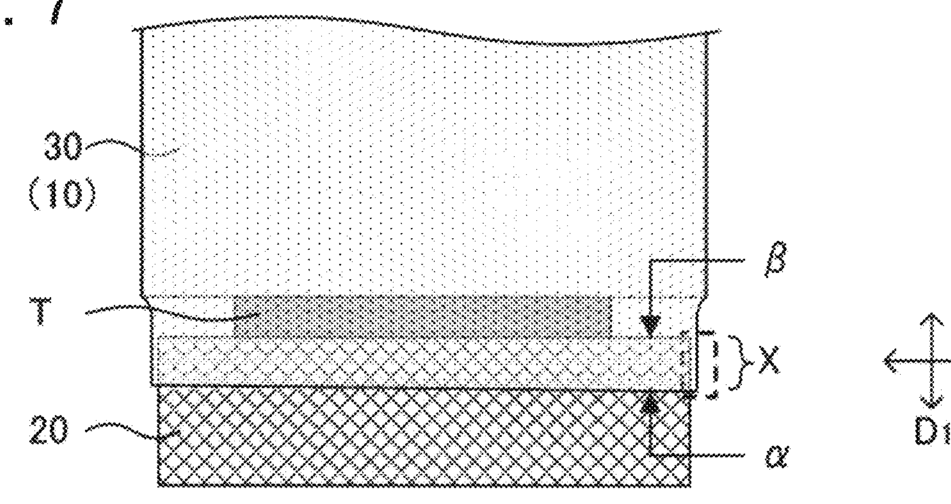
FIG. 7 is a schematic plan view illustrating part of the battery in the present disclosure.
Figure 8:
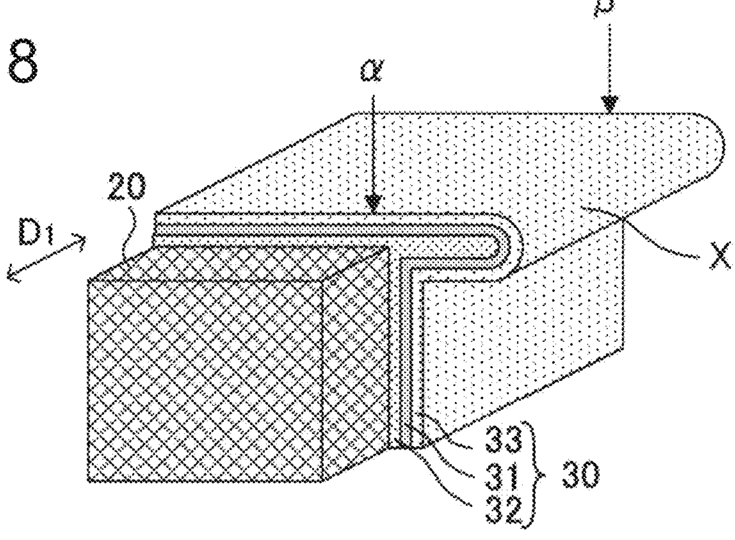
FIG. 8 is a schematic perspective view illustrating part of the battery in the present disclosure.

As shown in FIGS. 7 and 8, when the battery is viewed from the thickness direction in plan view, the end position of the laminate film 30 on the current collector terminal 20 side is α, and a position of the laminate film 30 that corresponds to the boundary between the current collector terminal 20 and the electrode body 10 is β. The welded portions X in FIGS. 7 and 8 are arranged continuously from the end position a to the position β. Further, when a direction (an axial direction) in which the current collector terminal 20 extends from the electrode body 10 is $D_1$, the welded portion X is desirably disposed along $D_1$. Also, the welded portion X may be disposed in at least a part of a region from the end position a to the position β in $D_1$. The length of the welded portion X in $D_1$ is, for example, 1 mm or more, and may be 3 mm or more, or may be 5 mm or more.

As shown in FIG. 5, the laminate film 30 includes at least the metal layer 31. The laminate film 30 desirably includes the inner resin layer 32 on the surface of the metal layer 31 on the current collector terminal 20 side. Further, the laminate film 30 desirably includes the outer resin layer 33 on the opposite surface of the metal layer 31 from the current collector terminal 20 side. In the welded portion X, the first resin layer $R_1$ is disposed between the metal layers 31 facing each other. The second resin layer $R_2$ is disposed between the metal layer 31 and the current collector terminal 20. As shown in FIG. 5, the thickness of the first resin layer $R_1$ is $T_a$, and the thickness of the second resin layer $R_2$ is $T_b$. $T_a$ and $T_b$ satisfy $0.25 \leq T_a/T_b$. $T_a/T_b$ may be 0.5 or more, 0.75 or more, 1.0 or more, 1.1 or more, or 1.2 or more. On the other hand, $T_a/T_b$ is, for example, less than 2.0, and may be 1.8 or less. Each of $T_a$ and $T_b$ is desirably an average value of thicknesses measured at a plurality of locations. Moreover, the values of $T_a$ and $T_b$ can be controlled by appropriately adjusting the conditions for covering the current collector terminal with the laminate film.

As shown in FIG. 5, the thickness of the metal layer 31 at the welded portion X is $T_c$. $T_a$ and $T_c$ desirably satisfy $0.5 \leq T_a/T_c \leq 7$. This is because damage to the welded portion X due to thermal shock can be suppressed. When a thermal shock is applied to the battery, the first resin layer at the welded portion X expands more than the metal layer. Therefore, in a case where $T_a/T_c$ is too large, the metal layer may be damaged due to stress during expansion. On the other hand, by setting $T_a/T_c$ to seven or less, damage to the welded portion X due to thermal shock can be suppressed. On the other hand, in a case where $T_a/T_c$ is too small, good sealing performance may not be obtained. $T_a/T_c$ may be 0.75 or more, or 1.0 or more. On the other hand, $T_a/T_c$ may be 4.0 or less, or may be 3.5 or less. When $T_a/T_c$ is 4.0 or less, damage to the welded portion X due to thermal shock is remarkably suppressed. $T_c$ is desirably an average value of thicknesses measured at a plurality of locations. Moreover, the value of $T_c$ is basically unaffected by the conditions under which the current collector terminal is covered with the laminate film.

Figure 9A:
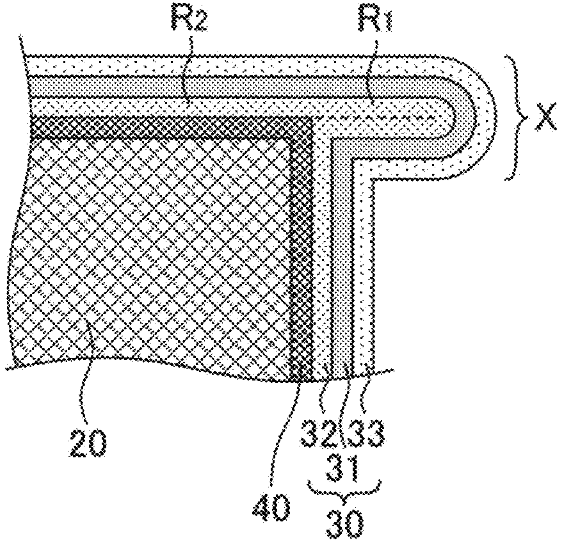
FIG. 9A is a schematic side view illustrating part of the battery in the present disclosure.

As shown in FIG. 9A, a resin film 40 may be disposed between the inner resin layer 32 of the laminate film 30 and the current collector terminal 20. By disposing the resin film 40, adhesion between the laminate film 30 and the current collector terminal 20 is improved. In FIG. 9A, the first resin layer $R_1$ includes the inner resin layer 32 but does not include the resin film 40. In contrast, the second resin layer $R_2$ includes the inner resin layer 32 and the resin film 40.

Figure 9B:
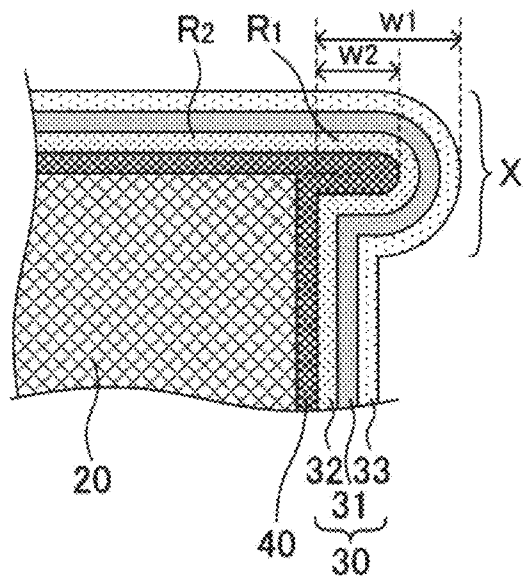
FIG. 9B is a schematic side view illustrating part of the battery in the present disclosure.

As shown in FIG. 9B, the first resin layer $R_1$ may include both the inner resin layer 32 and the resin film 40. That is, the welded portion X may include a protrusion of the resin film 40. By forming the welded portion X in such a manner that the welded portion X covers the protrusion of the resin film 40, the occurrence of a gap at the welded portion X can be suppressed. The welded portion X may have a third surface, a fourth surface, and a curved surface connecting the third surface and the fourth surface. The fourth surface is on the opposite side of the protrusion from the third surface, and is located on an outer side of the third surface in the thickness direction $D_T$ of the battery. Moreover, the normal direction of the third surface and the normal direction of the fourth surface are desirably parallel to the thickness direction $D_T$ of the battery. Further, as shown in FIG. 9B, the width of the welded portion X is $w_1$, and the width of the protrusion of the resin film 40 is $w_2$. The ratio of the width $w_2$ to the width $w_1$ ($w_2/w_1$) is, for example, 0.1 or more, and may be 0.3 or more, or may be 0.5 or more. On the other hand, $w_2/w_1$ is, for example, 0.9 or less. A desirable value for the width $w_1$ is as described above. On the other hand, the width $w_2$ is, for example, 0.1 mm or more, and may be 0.2 mm or more, or may be 0.5 mm or more. On the other hand, the width $w_2$ is, for example, 1.9 mm or less.

Figure 10A:
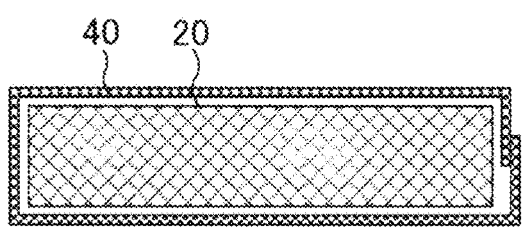
FIG. 10A is a schematic side view illustrating a method of forming a protrusion of a resin film in the present disclosure.
Figure 10B:
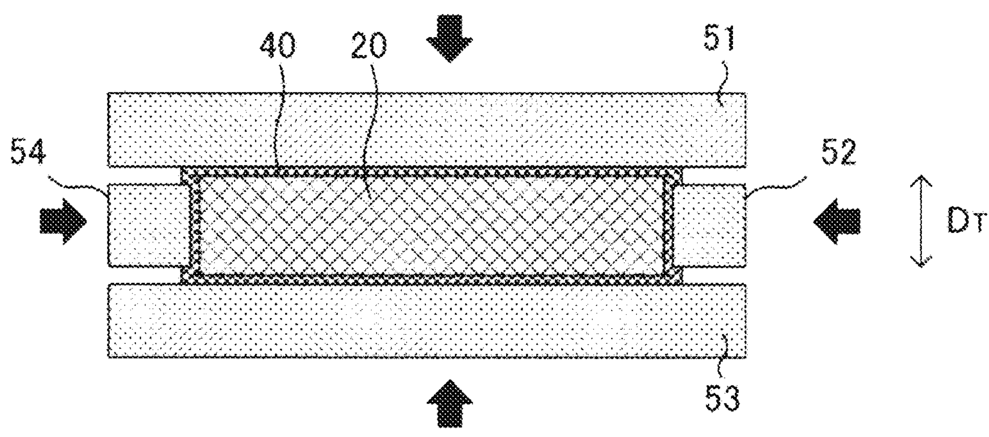
FIG. 10B is a schematic side view illustrating the method of forming the protrusion of the resin film in the present disclosure.
Figure 10C:
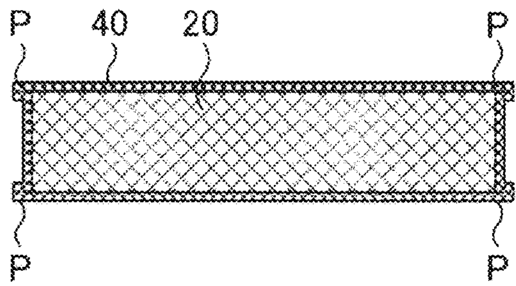
FIG. 10C is a schematic side view illustrating the method of forming the protrusion of the resin film in the present disclosure.

FIGS. 10A, 10B, and 10C are each a schematic side view illustrating a method of forming the protrusion of the resin film in the present disclosure. As shown in FIG. 10A, the resin film 40 is disposed around the current collector terminal 20. At this time, the length of the outer edge of the resin film 40 is made longer than the length of the outer edge of the current collector terminal 20 in order to form the protrusion. Next, as shown in FIG. 10B, a jig 51, a jig 52, a jig 53, and a jig 54 are pushed toward the current collector terminal 20 and the resin film 40. It is desirable that the jigs 51 to 54 are heated. In the thickness direction $D_T$, the lengths (lengths in the up-down direction of the drawing) of the jig 52 and the jig 54 are shorter than the length (length in the up-down direction of the drawing) of the current collector terminal 20. Therefore, for example, a gap is generated between the jig 51 and the jig 52, and the surplus portions of the resin film 40 gather in the gap. As a result, protrusions P of the resin film are formed as shown in FIG. 10C. The thickness of the protrusion P can be adjusted in accordance with the amount of the gap between the jig 51 and the jig 52.

2. Member of Battery

A battery in the present disclosure includes an electrode body, a current collector terminal, and a laminate film.

(1) Electrode Body

Figure 11:
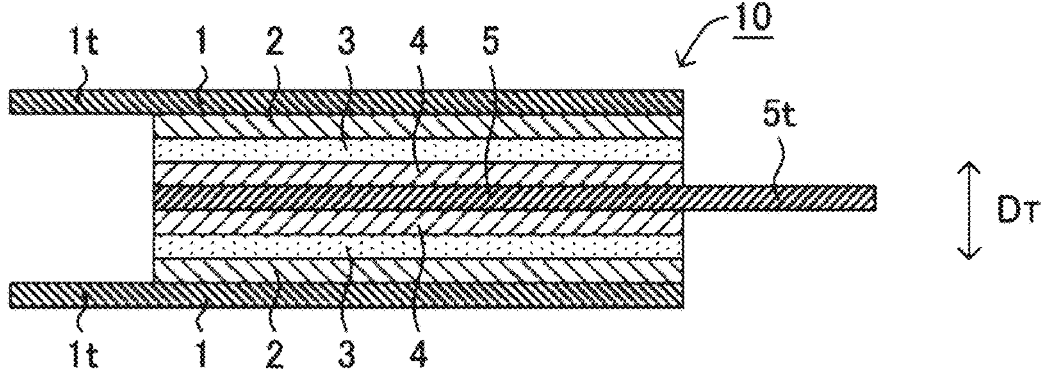
FIG. 11 is a schematic sectional view illustrating the electrode body in the present disclosure.

The electrode body in the present disclosure includes, for example, as shown in FIG. 11, a positive electrode current collector 1, a positive electrode active material layer 2, an electrolyte layer 3, a negative electrode active material layer 4, and a negative electrode current collector 5 in this order in the thickness direction $D_T$. When the positive electrode active material layer 2, the electrolyte layer 3, and the negative electrode active material layer 4 are set as a power generation unit, the electrode body desirably has a plurality of power generation units. Moreover, as shown in FIG. 11, the positive electrode current collector 1 desirably has a positive electrode tab 1*t*, and the negative electrode current collector 5 desirably has a negative electrode tab St.

The positive electrode active material layer contains at least a positive electrode active material. The positive electrode active material layer may further contain at least one of a conductive material, an electrolyte, and a binder. Examples of the positive electrode active material include oxide active material. Examples of oxide active material include rock salt layered type active material such as $LiNi_{1/3}Co_{1/3}Mn_{1/3}O_2$, spinel type active material such as $LiMn_2O_4$, and olivine type active material such as $LiFePO_4$. Sulfur (S) may also be used as the positive electrode active material. The shape of the positive electrode active material is, for example, particulate.

Examples of the conductive material include carbon material. The electrolyte may be a solid electrolyte or a liquid electrolyte. The solid electrolyte may be an organic solid electrolyte such as a gel electrolyte, or an inorganic solid electrolyte such as an oxide solid electrolyte and a sulfide solid electrolyte. The liquid electrolyte (electrolytic solution) contains, for example, a supporting salt such as $LiPF_6$ and a solvent such as a carbonate-based solvent. Examples of the binder include a rubber-based binder and a fluoride-based binder.

The negative electrode active material layer contains at least a negative electrode active material. The negative electrode active material layer may further contain at least one of a conductive material, an electrolyte, and a binder. Examples of the negative electrode active material include metal active material such as Li and Si, carbon active material such as graphite, and oxide active material such as $Li_4Ti_5O_{12}$. The shape of the negative electrode active material is, for example, particulate or foil. The conductive material, the electrolyte, and the binder are similar to those described above.

The electrolyte layer is disposed between the positive electrode active material layer and the negative electrode active material layer and contains at least an electrolyte. The electrolyte may be a solid electrolyte or a liquid electrolyte. The electrolyte is similar to those described above. The electrolyte layer may have a separator.

The positive electrode current collector collects current from the positive electrode active material layer. Examples of the material of the positive electrode current collector include metals such as aluminum, SUS, and nickel. Examples of the shape of the positive electrode current collector include a foil shape and a mesh shape. The positive electrode current collector may have a positive electrode tab for connecting to the positive electrode current collector terminal.

The negative electrode current collector collects current from the negative electrode active material layer. Examples of the material of the negative electrode current collector include metals such as copper, SUS, and nickel. Examples of the shape of the negative electrode current collector include a foil shape and a mesh shape. The negative electrode current collector may have a negative electrode tab for connecting to the negative electrode current collector terminal.

(2) Current Collector Terminal

The current collector terminal in the present disclosure is disposed on the side surface portion of the electrode body. The current collector terminal is a terminal having a current collecting portion at least in part. The current collecting portion is, for example, electrically connected to a tab of the electrode body. The current collector terminal may be the current collecting portion as a whole, or may be partially the current collecting portion. Examples of the material of the current collector terminal include metals such as aluminum and SUS.

(3) Laminate Film

The laminate film in the present disclosure has at least a structure in which the inner resin layer and the metal layer are laminated. Moreover, the laminate film may have the inner resin layer, the metal layer, and the outer resin layer in this order along the thickness direction. Examples of the material of the inner resin layer include an olefin-based resin such as polypropylene (PP) and polyethylene (PE). Examples of the material of the metal layer include aluminum, aluminum alloy, and stainless steel. Examples of the material of the outer resin layer include polyethylene terephthalate (PET) and nylon. The thickness of the inner resin layer is, for example, 40 μm or more and 100 μam or less. The thickness of the metal layer is, for example, 30 μm or more and 100 μm or less. The thickness of the outer resin layer is, for example, 20 μm or more and 60 μm or less. The thickness of the laminate film is, for example, 80 μm or more and 250 μm or less. Further, a resin film may be disposed between the laminate film and the current collector terminal. Examples of the material of the resin film include an olefin-based resin such as polypropylene (PP) and polyethylene (PE).

(4) Battery

The battery in the present disclosure is typically a lithium ion secondary battery. Applications of the battery include, for example, a power source for vehicles such as hybrid electric vehicles (HEVs), plug-in hybrid electric vehicles (PHEVs), battery electric vehicles (BEVs), gasoline vehicles, and diesel vehicles. In particular, it is desirable that the battery is used as a drive power source for hybrid electric vehicles (HEVs), plug-in hybrid electric vehicles (PHEVs), or battery electric vehicles (BEVs). Also, the battery in the present disclosure may be used as a power source for mobile bodies other than vehicles (for example, railroads, ships, and aircraft), and may be used as a power source for electric products such as an information processing device. Further, in the present disclosure, it is also possible to provide a battery module in which multiple batteries described above are stacked in the thickness direction.

3. Method for Manufacturing Battery

A method for manufacturing a battery according to the present disclosure includes, for example, a preparation step of preparing a structure having the electrode body and the current collector terminal, a first covering step of covering the surface forming the outer edge of the electrode body in the structure with the laminate film, and a second covering step of covering the surface forming the outer edge of the current collector terminal in the structure with the laminate film.

(1) Preparation Step

The preparation step is a step of preparing a structure having the electrode body and the current collector terminal. Since the electrode body and the current collector terminal are similar to those described in the above "A. Battery", description thereof is omitted here.

(2) First Covering Step

The first covering step in the present disclosure is a step of covering the outer edge of the electrode body in the structure with the laminate film. For example, as shown in FIGS. 2A and 2B, in the first covering step, the surfaces (for example, the bottom surface portion 12, the second side surface portion 14, the top surface portion 11, and the fourth side surface portion 16) forming the outer edge of the electrode body 10 are covered with the laminate film 30. At this time, the electrode body 10 and the laminate film 30 may be welded or may not be welded. Also, as shown in FIG. 2B, the end portions-overlapped portion Z in which the end portions of the laminate film 30 are overlapped is heated. As a result, an end portions-adhesion portion Y is formed in which the end portions of the laminate film 30 are welded to each other. The laminate film may be preliminarily subjected to a bending process in accordance with the shape of the electrode body.

(3) Second Covering Step

The second covering step in the present disclosure is a step of covering surfaces forming the outer edge of the current collector terminal with the laminate film. Moreover, it is desirable to form a welded portion in the second covering step. The surface of the current collector terminal may be covered with a laminate film after the resin film described above is placed.

Figures 12A, 12B, 12C, 13:
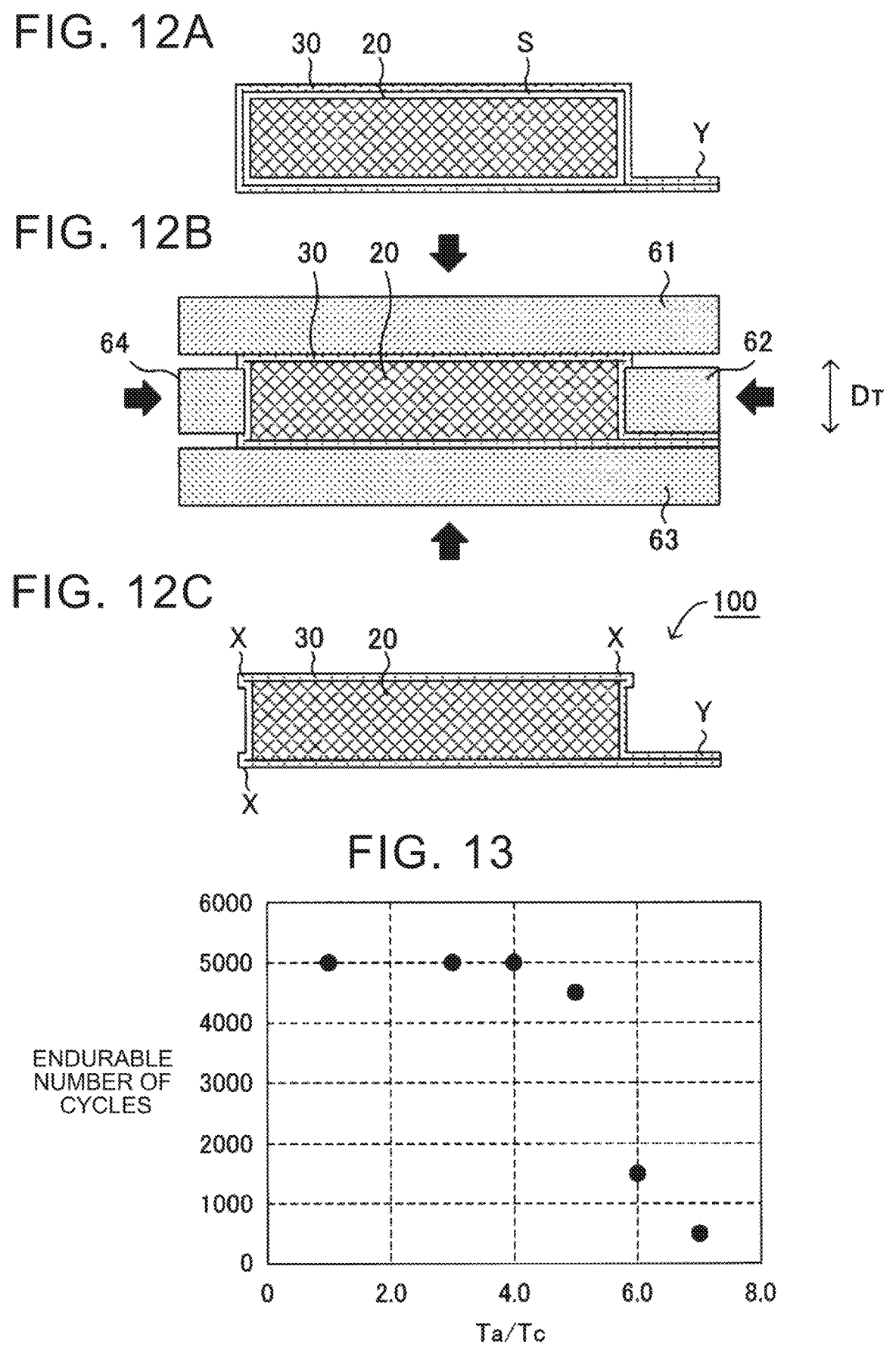

In the second covering step, the current collector terminal and the laminate film are welded to each other using a jig that can be in surface contact with the surfaces forming the outer edge of the current collector terminal. FIGS. 12A, 12B, and 12C are each a schematic side view illustrating the second covering step in the present disclosure. As shown in FIG. 12A, a space S is formed between the laminate film 30 and the current collector terminal 20 by the first covering step described above. Further, the end portions-adhesion portion Y is formed by the first covering step described above. Next, as shown in FIG. 12B, a jig 61, a jig 62, a jig 63, and a jig 64 are pushed toward the laminate film 30 and the current collector terminal 20. It is desirable that the jigs 61 to 64 are heated. In the thickness direction $D_T$, the lengths (lengths in the up-down direction of the drawing) of the jig 62 and the jig 64 are shorter than the length (length in the up-down direction of the drawing) of the current collector terminal 20. Therefore, for example, a gap is generated between the jig 61 and the jig 62, and the surplus portions of the laminate film 30 gather in the gap. As a result, as shown in FIG. 12C, welded portions X are formed, and a battery 100 is obtained. The thickness of the first resin layer at the welded portion X can be adjusted in accordance with the amount of the gap between the jig 61 and the jig 62.

The present disclosure is not limited to the above embodiments. The above embodiments are illustrative, and anything having substantially the same configuration as, and having similar functions and effects to, the technical idea described in the claims of the present disclosure is included in the technical scope of the present disclosure.

A laminate film including aluminum (Al) as a metal layer and PE as an inner resin layer was prepared. Next, in the same manner as in FIG. 2A and FIG. 2B, a structure including an electrode body and a current collector terminal was prepared, and the surfaces forming the outer edge of the electrode body in the structure were covered with a laminate film. Next, in the same manner as in FIG. 12A, FIG. 12B, and FIG. 12C, the surfaces forming the outer edge of the current collector terminal were covered with the laminate film to produce a battery. Here, $T_a/T_c$ was adjusted by adjusting the heights of the jig 62 and the jig 64 in FIG. 12A, FIG. 12B, and FIG. 12C. A thermal shock test (−15° C. to 95° C.) was performed on the obtained battery. Every 500 cycles, the metal layer (Al) in the laminate film was observed with a microscope to confirm the presence or absence of a crack. The results are shown in Table 1.

TABLE 1

| | Thermal Shock Test/Number of Cycles | | | | | | | | | | |
|---|---|---|---|---|---|---|---|---|---|---|---|
| $T_a/T_c$ | 0 | 500 | 1000 | 1500 | 2000 | 2500 | 3000 | 3500 | 4000 | 4500 | 5000 |
| 1.0 | Absent | Absent | Absent | Absent | Absent | Absent | Absent | Absent | Absent | Absent | Absent |
| 3.0 | Absent | Absent | Absent | Absent | Absent | Absent | Absent | Absent | Absent | Absent | Absent |
| 4.0 | Absent | Absent | Absent | Absent | Absent | Absent | Absent | Absent | Absent | Absent | Absent |
| 5.0 | Absent | Absent | Absent | Absent | Absent | Absent | Absent | Absent | Absent | Absent | Present |
| 6.0 | Absent | Absent | Absent | Absent | Absent | Present | Present | Present | Present | Present | Present |
| 7.0 | Absent | Absent | Present | Present | Present | Present | Present | Present | Present | Present | Present |

As shown in Table 1, when $T_a/T_c$ was 4.0 or less, damage was not observed in the laminate film even in 5000 cycles. On the other hand, when $T_a/T_c$ was 5.0, damage was not observed in the laminate film up to 4500 cycles, when $T_a/T_c$ was 6.0, damage was not observed in the laminate film up to 2000 cycles, and when $T_a/T_c$ was 7.0, damage was not observed in the laminate film up to 500 cycles.

The maximum number of cycles in which damage was not observed in the laminate film was defined as the endurable number of cycles. FIG. 13 shows the relationship between $T_a/T_c$ and the endurable number of cycles. As shown in FIG. 13, it was confirmed that when $T_a/T_c$ was 4.0 or less, the endurable number of cycles was remarkably improved.

What is claimed is:

1. A battery comprising:

an electrode body;

a current collector terminal disposed on a side surface portion of the electrode body; and a laminate film covering the electrode body, wherein:

when the battery is viewed from the current collector terminal side in side view, an outer edge of the current collector terminal is located on an inner side of an outer edge of the electrode body;

the laminate film is disposed so as to cover a surface constituting the outer edge of the current collector terminal and a surface constituting the outer edge of the electrode body;

a welded portion in which a first portion of an inner surface of the laminate film is welded to a second portion of the inner surface of the laminated film is disposed at a corner portion of the current collector terminal;

the laminate film includes at least a metal layer;

in the welded portion, a portion of the metal layer is folded and a first resin layer is disposed between the portion of the metal layer;

a second resin layer is disposed between the metal layer and the current collector terminal; and when a thickness of the first resin layer is $T_a$ and a thickness of the second resin layer is $T_b$, the $T_a$ and the $T_b$ satisfy $0.25 \leq T_a/T_b$.

2. The battery according to claim 1, wherein when a thickness of the metal layer in the welded portion is $T_c$, the $T_a$ and the $T_c$ satisfy $0.5 \leq T_a/T_c \leq 4$.

3. The battery according to claim 1, wherein:

the laminate film includes an inner resin layer on a surface of the metal layer on the current collector terminal side; and the first resin layer and the second resin layer each include the inner resin layer.

4. The battery according to claim 3, wherein:

a resin film is disposed between the inner resin layer and the current collector terminal; and the first resin layer includes the resin film.

* * * * *